US005369480A

United States Patent [19]

Isobe

[11] Patent Number: 5,369,480

[45] Date of Patent: Nov. 29, 1994

[54] MULTIFUNCTIONAL PRINTER

[75] Inventor: Minoru Isobe, Tokyo, Japan

[73] Assignee: Oki Electric Industry Co., Ltd., Tokyo, Japan

[21] Appl. No.: 943,720

[22] Filed: Sep. 11, 1992

[30] Foreign Application Priority Data

Sep. 26, 1991 [JP] Japan .................................. 3-247434

[51] Int. Cl.[5] ...................... G03G 15/00; G03G 21/00

[52] U.S. Cl. .................................. 355/320; 346/160; 355/210; 355/308; 355/309

[58] Field of Search ............... 355/200, 202, 210, 228, 355/229, 308, 309, 318, 319, 320; 346/160; 271/301, 65, 186

[56] References Cited

U.S. PATENT DOCUMENTS

| | | | |
|---|---|---|---|
| 4,379,631 | 4/1983 | Kitamura | 355/202 |
| 4,424,524 | 1/1984 | Daniele | 346/160 |
| 4,450,458 | 5/1984 | Araghi et al. | 346/160 X |
| 4,600,296 | 7/1986 | Hage | 355/211 |
| 4,650,176 | 3/1987 | Sugizaki et al. | 271/65 X |
| 4,669,853 | 6/1987 | Sosinski et al. | 355/309 |
| 4,696,562 | 9/1987 | Urata et al. | 355/202 |
| 4,975,749 | 12/1990 | Tsunoda et al. | 355/320 |
| 5,055,946 | 10/1991 | Kurahashi et al. | 358/498 |
| 5,150,167 | 9/1992 | Gonda et al. | 355/200 |

FOREIGN PATENT DOCUMENTS

| | | |
|---|---|---|
| 4018123A1 | 6/1990 | Germany . |
| 1-105970 | 4/1989 | Japan . |
| 1-172055 | 12/1989 | Japan . |
| 2217261A | 10/1989 | United Kingdom . |

*Primary Examiner*—A. T. Grimley
*Assistant Examiner*—Sandra L. Brasé
*Attorney, Agent, or Firm*—Steven M. Rabin

[57] ABSTRACT

A multifunctional printer includes a printing portion for printing data on a print medium, a read head for reading data on a read medium, and an enclosed medium carrying passage. The printing portion comprises an electrophotographic record portion. The enclosed medium carrying passage is disposed so as to surround the printing portion and is capable of transferring both the print medium and the read medium. A reversing portion is disposed on the enclosed medium carrying passage to turn the medium upside down. With the arrangement of this multifunctional printer, it is possible to perform double-sided printing on the printed medium and to perform double-sided reading on the read medium. It is also possible to make a multifunctional small-sized printer.

23 Claims, 8 Drawing Sheets

MULTIFUNCTIONAL PRINTER

BACKGROUND OF THE INVENTION

1. Field of the Invention

The present invention relates to a multifunctional printer and particularly to a printer having double-sided printing and double-sided reading functions.

2. Description of the Related Art

A conventional printer related to the present invention is disclosed in Japanese Patent Laid-Open Publication No. 1-105970. In this printer, the passage for carrying a medium on which is provided subject matter to be read, such as printed matter, is arranged linearly with respect to a passage for carrying a medium to be printed upon such as a copying sheet, respectively. However, a printer of this type can perform neither double-sided reading nor double-sided printing. Japanese Utility Model Laid-Open Publication No. 1-172055 discloses a printer capable of performing double-sided printing. However, this printer has disadvantages in that it has no means to read printed matter and is large in size because the enclosed carrying passage used to reverse the medium is arranged outside the print record portion in the printer body.

SUMMARY OF THE INVENTION

It is an object of the present invention to provide a small-sized multifunctional printer having a reading function and provided with a carrying passage which can be used in common to carry a medium on which data to be red is provided, hereinafter called "read medium" and to carry a medium to be printed upon, hereinafter called "print medium".

Another object of the present invention is to provide an excellent multifunctional printer which is capable of performing double-sided reading and double-sided printing.

A multifunctional printer according to a first aspect of the present invention that fulfills the first-mentioned object, comprises an enclosed medium carrying passage which connects a print medium travel path passing a printing portion to a read medium carrying passage passing a reading portion and which surrounds the printing portion, and a reversing portion arranged in the medium carrying passage, for turning the medium upside down.

A multifunctional printer according to a second aspect of the present invention that fulfills the last-mentioned object, comprises an enclosed medium carrying passage, a printing portion which is composed of an electrophotographic record portion, and a common head disposed between the electrophotographic record portion and a read medium carrying passage, whereby the record portion and the head perform a reading operation on the read medium and a light exposing operation.

Since the multifunctional printer according to the present invention has a medium carrying passage used in common for read medium and print medium, the entire travel path in the printer can be shortened, whereby it is possible to make a small-sized printer.

Since the printer according to the present invention also has an enclosed medium carrying passage structure and a medium reversing portion, it is possible to perform both a double-sided reading operation and a double-sided printing operation. After data is read from one side of a piece of the medium, printing can be additionally performed on an opposite blank side thereof. After printing is performed on a blank space on one side of a piece of the medium, a reading operation can be performed on the opposite side thereof.

Furthermore, with a common head that can both read the data on the read medium and expose the medium to the photoconductive body, it is possible to make the printer smaller in size.

DESCRIPTION OF THE PREFERRED EMBODIMENTS

First Embodiment (FIGS. 1 to 7)

A multifunctional printer according to the first embodiment of the present invention will be described with reference to FIGS. 1 to 7.

Figure 1:
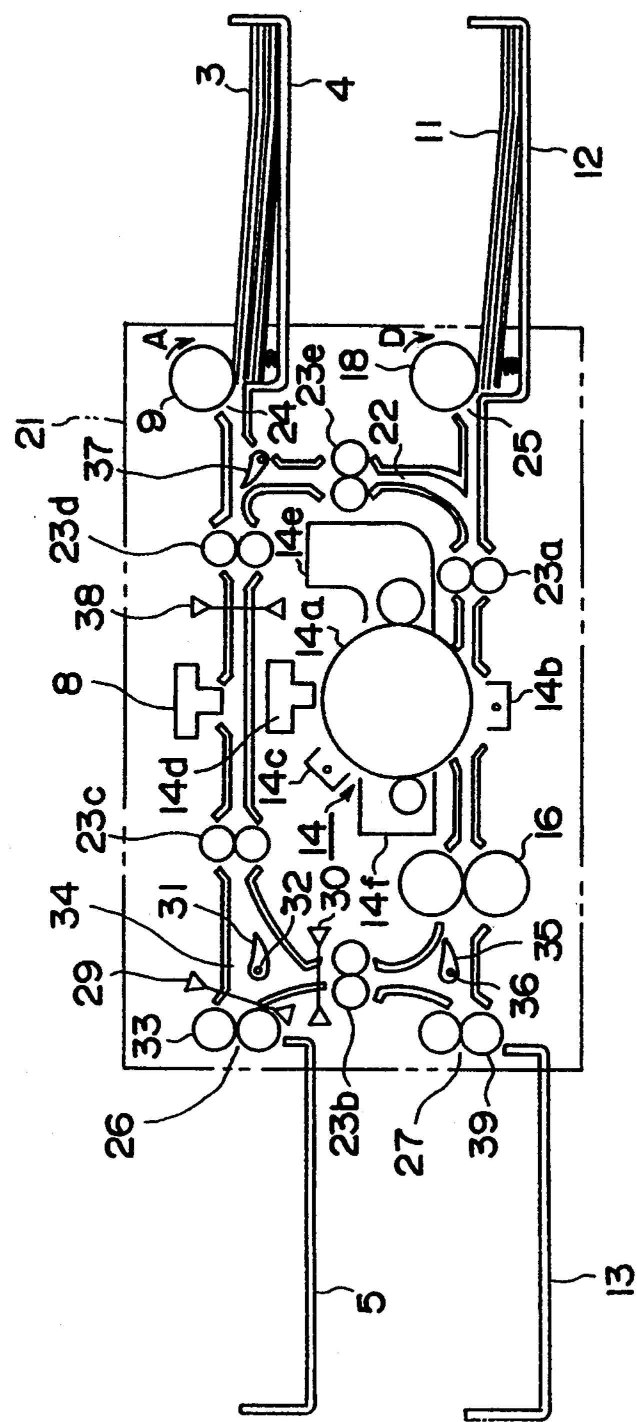
FIG. 1 is a view showing an arrangement of a multifunctional printer according to a first embodiment of the present invention.

In FIG. 1, an electrophotographic recording unit 21 serving as a multifunctional printer includes a hopper 4 for accommodating therein read medium 3 such as printed or typed sheets, a hopper 12 for accommodating therein print medium 11 such as sheets of copy paper, a stacker 5 for accommodating therein the read medium 3, and a stacker 13 for accommodating therein the print medium 11. The hoppers 4 and 12 are disposed at one end of the electrophotographic recording unit 21 and the stackers 5 and 13 are respectively disposed at the opposite end thereof.

The electrophotographic recording unit 21 further includes a data transferring means in the form of an electrophotographic recording portion for printing 14 disposed therein. The electrophotographic recording portion 14 comprises a photoconductor drum **14*a*, an electrostatic charging unit 14*c*, a -writing head 14*d*, a developing unit 14*e*, a transfer unit 14*b*** and a cleaning unit *14f*. An enclosed medium carping passage 22 forms a closed path so as to surround the electrophotographic recording portion 14. A fixing unit 16 and a plurality of conveying rollers **23*a*, 23*b*, 23*c*, 23*d* and 23*e* are respectively disposed rotatably on the way of the enclosed medium carrying passage 22 to convey medium along the passage 22. The enclosed medium carrying passage 22 passes between the photoconductor drum 14*a* and the transfer unit 14*b* and extends a medium reading portion wherein another data transferring means in the form of a reading head 8 is disposed over the electrophotographic recording portion 14. The reading head 8 comprises light-receiving elements such as light-receiving diodes and light-receiving transistors which are disposed in an array structure. The reading head 8 can read data printed on the print medium 11 by receiving light reflected from a piece of read medium 3 which passes under the reading head 8**.

The enclosed medium carrying passage 22 is connected to a feed port 24, at the right end of an upper segment of the passage 22, from which the read medium 3 is fed and also to a feed port 25, at the same (right) end of a lower segment of the passage 22 from which the print medium 11 is fed, and can guide the mediums 3 and 11 fed into the respective parts 24 and 25 by way of respective hopper rollers 9 and 18. Furthermore, the enclosed medium carrying passage 22 also is connected to a discharge port 26, at the opposite (right) end of the upper segment of the passage 22, from which the read medium 3 is discharged and to a discharge port 27, at the same (right) end of the lower segment of the passage 22, from which the print medium 11 is discharged. Detecting sensors 29 and 30 and a switching blade 31 are arranged respectively at the portion where the enclosed medium carrying passage 22 is connected to the discharge port 26. The detecting sensors 29 and 30 comprise respectively a light-emitting diode and a light-receiving transistor and detect the presence of medium. The switching blade 31 is rotatable about a fulcrum 32 and can switch the travelling direction of medium. A reversing portion 34 comprises the detecting sensors 29 and 30, the switching blade 31 and discharge rollers 33, and can reverse the surface of the read medium 3 or the print medium 11.

A switching blade 35 is mounted turnably about a fulcrum 36 at the portion where the enclosed medium carrying passage 22 is connected to a discharge port 27, and can switch the travelling direction of the print medium 11. Furthermore, a switching blade 37 is mounted turnably at the portion where the enclosed medium carrying passage 22 is connected to the feed port 24, and can switch the travelling direction of the read medium 3. A detecting sensor 38 is composed of a light-emitting diode and a light-receiving transistor. The sensor 38 is arranged between the reading head 8 and the conveying rollers 23d and can detect the presence of medium which travels in the enclosed medium carrying passage 22.

Figure 2:
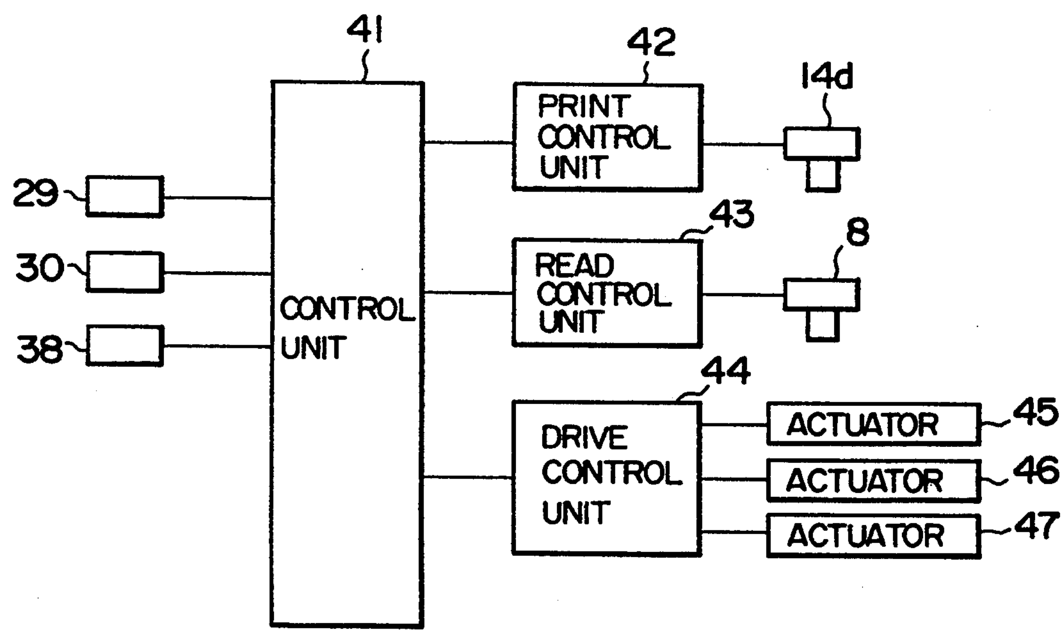
FIG. 2 is a block diagram showing an arrangement of a control mechanism of the multifunctional printer of FIG. 1.

FIG. 2 shows a block diagram of the control mechanism of the multifunctional printer according to the first embodiment of the present invention.

In FIG. 2, a control unit 41 comprises, for example, a microcomputer for controlling the entire operation of the electrophotographic recording unit 21 and is connected to a print control portion 42, a read control portion 43 and a drive control portion 44. The print control portion 42 processes the print data supplied from the control unit 41 and sends the processed data to the writing head **14*d*. The reading control portion 43 is connected to the reading head 8 and processes the data read by the reading head 8. The drive control portion 44 drives various motors, not shown, in the electrophotographic recording unit 21 for thereby driving the electrophotographic recording portion 14 and the conveying rollers 23*a* to 23*c*, etc. The drive control portion 44 also is connected to actuators 45, 46 and 47 and drives them. The actuator 45 is connected, as illustrated in FIG. 1, to the switching blade 31. When the actuator 45 is driven, the switching blade 31 turns. Likewise, the actuator 46 is connected to the switching blade 35 to turn the switching blade 35. The actuator 47 is connected to the switching blade 37 to turn the switching blade 37**.

The control unit 41 is connected to the detecting sensors 29, 30 and 38 and receives detecting signals issued by these sensors.

Figure 3:
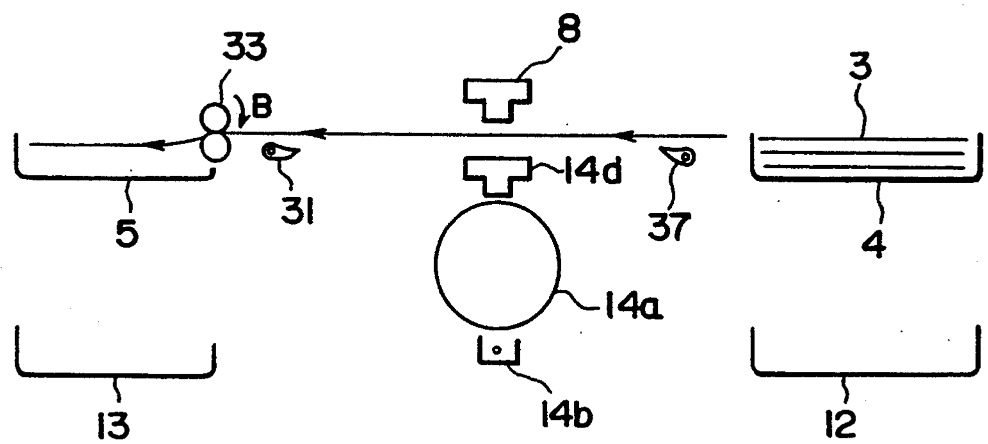
FIG. 3 is a view for explaining the performance of single-sided reading according to the first embodiment illustrated in FIG. 1.
Figure 4:
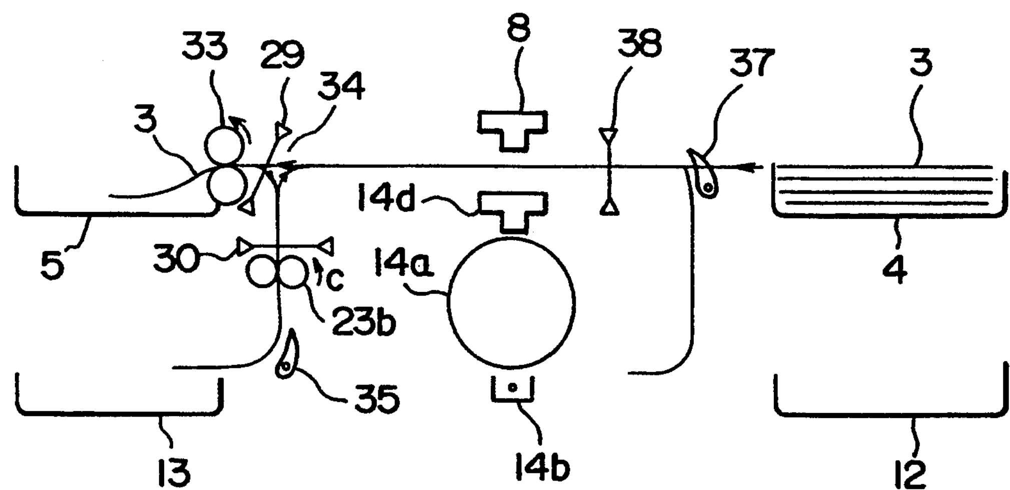
FIG. 4 is a view for explaining the performance of double-sided reading according to the first embodiment illustrated in FIG. 1.

An operation of the first embodiment will be described hereinafter. Reading operation will be first described with reference to FIGS. 3 and 4. FIG. 3 shows a view for explaining the performance of a "single-sided reading", that is, reading of any one side of a read medium, and FIG. 4 is a view explaining the performance of a "double-sided reading", that is, reading both sides of two opposite sides of a read medium.

Performance of single-sided reading will be described with reference to FIG. 3.

When a motor, not shown, is rotated upon reception of a drive signal issued by the drive control portion 44, the hopper roller 9 is rotated in the direction of the arrow A, as illustrated in FIG. 1, so that the read medium 3 is fed from the hopper 4. Data to be read is on an upper surface of the read medium in FIG. 3. At this time, the switching blade 37 is in the state as illustrated in FIG. 3. The read medium 3 passes over the switching blade 37 and enters the enclosed medium carrying passage 22 and thereafter passes under the reading head 8. At this time, light from a light source, not shown, is radiated on the read medium 3 and the reading head 8 receives the light reflected from the read medium 3 to read the data on the read medium 3. Then after the data reading operation, the read medium 3 is fed toward the discharge rollers 33. At this time, the switching blade 31 is in the state a in FIG. 5. The read medium 3 is discharged toward the stacker 5 by passing over the blade 31 when the rollers 33 are rotated in the direction of the arrow B in FIG. 3. The read data is sent to the control unit 41 to be processed therein.

Figure 5:
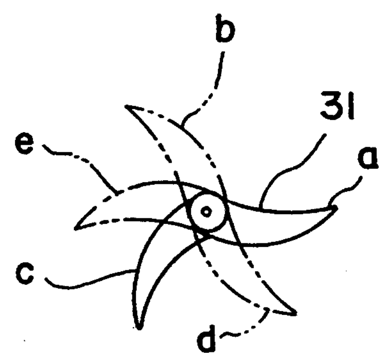
FIG. 5 is a view for explaining the switching operation of a switching blade according to the first embodiment illustrated in FIG. 1.

The performance of double-sided reading will be described hereinafter with reference to FIGS. 1, 4 and 5.

The performance of the double-sided reading is same as that of single-sided reading until data on one side (upper side) of the read medium 3 is read. Upon completion of the single-sided reading, the read medium 3 is conveyed while clamped by the discharge rollers 33 and is detected by the detecting sensor 29, until the rear end of the read medium 3 is detected by the detecting sensor 29. At this time, the control unit 41 illustrated in FIG. 2 stops rotating the discharge rollers 33, with the read medium 3 clamped by the discharge rollers 33. The control unit 41 drives the actuator 45 by way of the drive control portion 44 and then turns the switching blade 31, thus being positioned in the state b illustrated in FIG. 5. Successively, the controller unit 41 rotates the discharge rollers 33 in the reverse direction, or in the direction of the arrow shown in FIG. 4, by way of the drive control portion 44, to feed the read medium 3 backward, thereby rotating the conveying rollers **23*b* in the direction of the arrow E in FIG. 4. At this time, the conveying rollers 23*b* rotate in the direction of the arrow C. When the detecting sensor 30 confirms the passing of the rear end of the read medium 3, the control unit 41 stops rotating the conveying rollers 23*b*, thereby stopping the conveyance of the read medium 3. At this time, the switching blade 31 is positioned in the state C illustrated in FIG. 5. Thereafter, the control unit 41 rotates the conveying rollers 23*b* in a reverse direction whereby the read medium 3 is re-carried in a reverse direction in the closed medium carrying passage 22. As shown in FIG. 4, the read medium 3 is conveyed rightward at the reversing portion 34 and passes under the reading head 8. At this time, the switching blade 37 is switched to the position illustrated in FIG. 4, so that the read medium 3 is guided by the switching blade 37 in the enclosed medium carrying passage 22 toward the conveying rollers 23*e*. At this time, the conveying rollers 23*e* are rotated to feed the read medium 3 in the downward direction. When the rear end of the read medium 3 is detected by the detecting sensor 38, the control unit 41 confirms that the read medium 3 has passed the read head 8 and thereafter stops the conveyance of the read medium 3. When the direction of travel of the read medium 3 is reversed again, under the control of the control unit 41, the read medium 3 is conveyed with the back side thereof (what was the lower surface when the medium was accommodated in the hopper 4) facing the reading head 8. Then the reading head 8 starts to read the data on the back side (or lower surface) of the read medium 3. Upon completion of the reading operation, the read medium 3 is discharged into the stacker 5 through the discharge rollers 33**, in the same way as during the performance of the single-sided reading.

Figure 6:
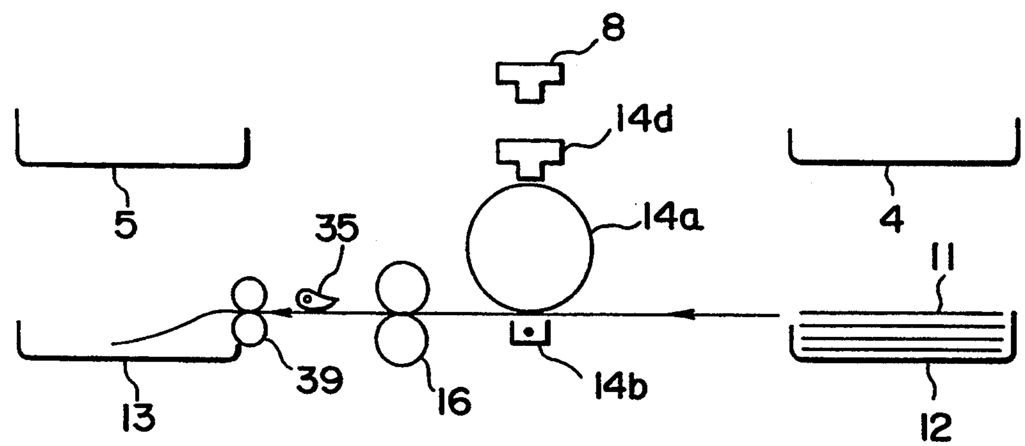
FIG. 6 is a view for explaining the performance of a single-sided printing according to the first embodiment illustrated in FIG. 1.

Printing operation of the multifunctional printer according to the first embodiment will be described with reference to 6 and 7. FIG. 6 is a view explaining the performance of a single-sided printing and FIG. 7 is a view explaining the performance of a double-sided printing.

In the case of performing single-sided printing, as illustrated in FIG. 1, when the hopper roller 18 is rotated in the direction of the arrow D, the print medium 11 is fed from the hopper 12 and enters the enclosed medium carrying passage 22. At this time, the conveying rollers **23*a* are rotated and the print medium 11 is conveyed toward the transfer unit 14*b*. In the electrophotographic recording portion 14, a toner image is formed on the surface of a photoconductor drum 14*a* in conformity with the conveying speed of the print medium 11 is conveyed, and the toner image is transferred from the photoconductor drum 14*a* to the face side (or upper surface) of the print medium 11 by the transfer unit 14*b* during the movement of the print medium 11 between the photoconductor 14*a* and the transfer unit 14*b*. The print medium 11 is thereafter conveyed toward the fixing unit 16 where the toner image is fixed on the surface of the print medium 11. In the case of performing single-sided printing, the switching blade 35 is positioned as illustrated in FIG. 6 and the print medium 11 passes under the switching blade 35, thus being discharged to the stacker 13 through the discharge rollers 39**.

Figure 7:
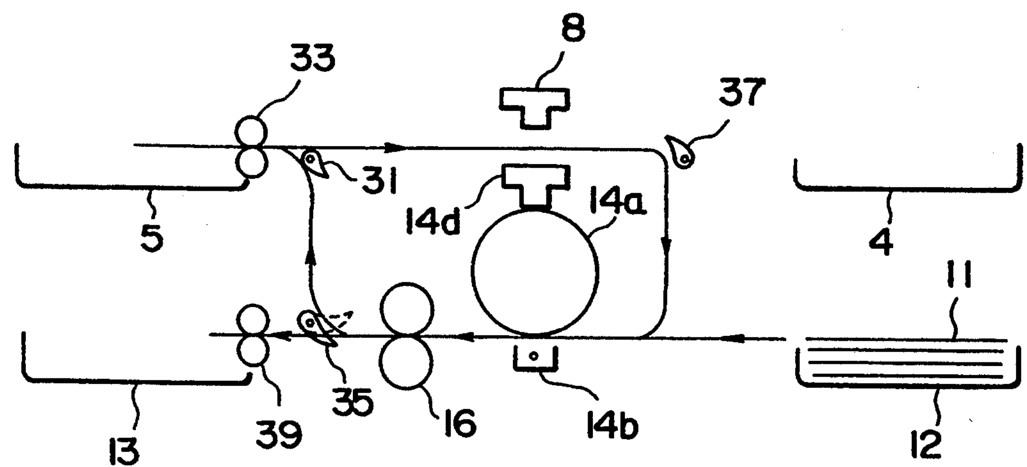
FIG. 7 is a view for explaining the performance of a double-sided printing according to the first embodiment illustrated in FIG. 1.

In the case of performing double-sided printing, the switching blade 35 is positioned as shown in a solid line in FIG. 7 by the time when the toner image is fixed on the face side (or upper surface) of the print medium 11. After the toner image is fixed on the face side (upper surface) of the print medium 11, the direction of travel of the print medium 11 is changed to the upward direction and is directed toward the reversing portion 34. The switching blade 31 in the reversing portion 34 is positioned at position d in FIG. 5. The print medium 11 which is conveyed toward the reversing portion 34 by the conveying rollers **23*b* is conveyed toward the discharge rollers 33. When the print medium 11 is moved in the direction of the stacker 5 while it is clamped by the discharge rollers 33 and the rear end thereof is detected by the detecting sensor 29, the control unit 41 stops the conveyance of the print medium 11 and rotates the switching blade 31 to the position e in FIG. 5, and then reverses the direction of travel of the print medium 11. Consequently, the side of the print medium 11 facing the photoconductor drum 14*a* is reversed and the print medium 11 travels in the enclosed medium carrying passage 22 in the direction of the arrow in FIG. 7. At this time, the switching blade 37 is positioned as illustrated in FIG. 7 and changes the direction of travel the print medium 11 to the downward direction. When the print medium 11 is conveyed in the enclosed medium carrying passage 22, the back side (lower surface) thereof faces the photoconductor drum 14*a* and enters between the photoconductor drum 14*a* and the transfer unit 14*b*. Although the toner image of data to be printed on the back side of the print medium 11 is formed on the surface of the photoconductor drum 14*a*, it is turned upside down compared with the one when the front side (upper surface) of the print medium 11** is printed.

After the toner image is transferred to the back side (or lower surface) of the print medium 11 by the transfer unit **14*b*, the transferred toner image is fixed on the print medium 11 by the fixing unit 16. At this time, the switching blade 35 is positioned as illustrated by a broken line in FIG. 7. After the toner image is fixed, the print medium 11 travels toward the discharge rollers 39 and is discharged to the stacker 13**.

Data to be printed on the print medium 11 may be issued by a host unit, not shown, connected to the electrophotographic recording unit 21, or may be read by the read head 8.

In the case of performing the single-sided printing, when the data read by the read head 8 is printed, it is possible to transmit the data read by the reading head 8 to the electrophotographic recording portion 14 as it is read, whereby the data can be printed on the print medium 11. In the case of performing double-sided printing, when the data on both sides of the read medium read by the reading head 8 is printed, the data thus read by the reading head 8 is once stored in a memory, not shown, of the control unit 41 and the read data is printed on both sides of the print medium 11.

Inasmuch as both the read medium 3 and the print medium 11 can travel in the enclosed medium carrying passage 22, it is possible to read continuously the data on one medium and print the data on the same medium. That is, after the data is first read by the reading head 8, printing may be performed by conveying the medium toward the printing position through the enclosed medium carrying passage 22, or reading may be performed after the data is printed.

In the case of performing double-sided reading or double-sided printing, the speed of the conveying medium at the data reading position or at the data printing position is set to the speed corresponding to the performance of the reading head 8 and the electrophotographic recording portion 14. However, it is possible to increase the processing speed of the medium as a whole by increasing the conveying speed of the medium in the enclosed medium carrying passage 22 at the portions other than the data reading position and the data printing position.

Figure 8:
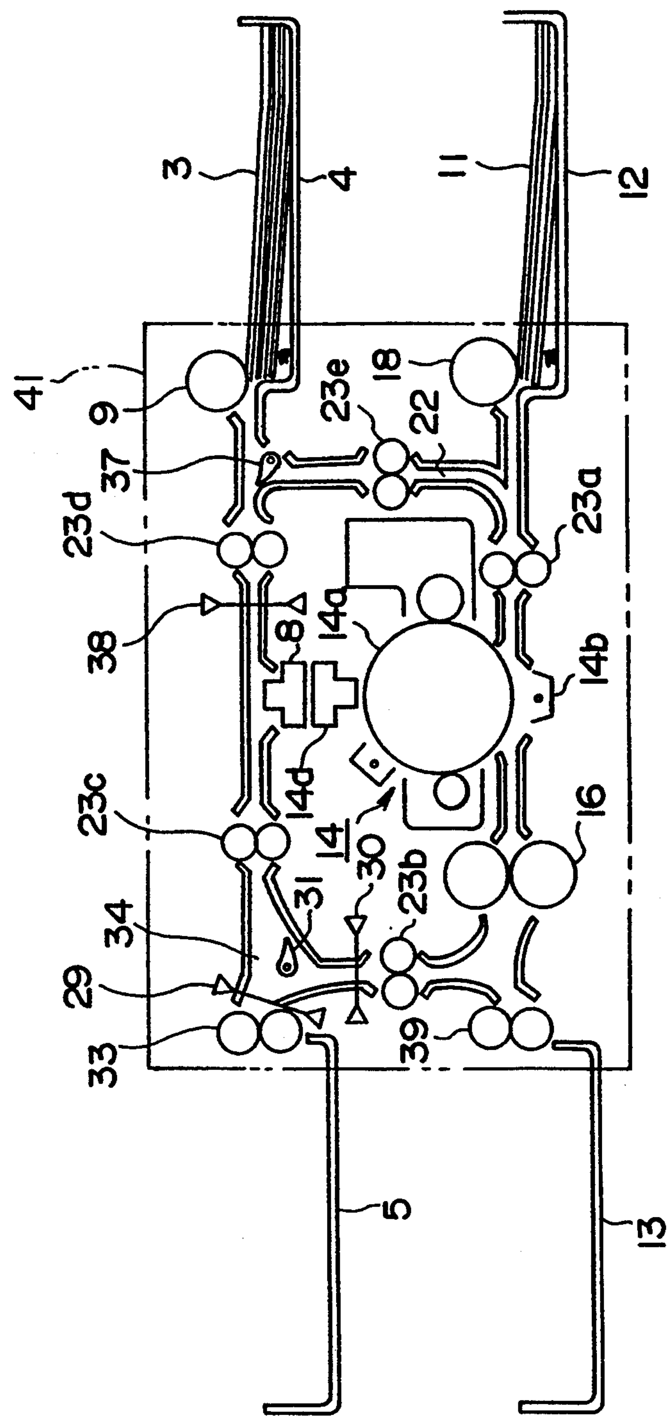
FIG. 8 is a view showing an arrangement of a multifunctional printer according to a second embodiment of the present invention.

Second Embodiment (FIG. 8)

A multifunctional printer according to a second embodiment of the present invention will be described with reference to FIG. 8.

In FIG. 8, the reading head 8 is disposed inside the enclosed medium carrying passage 22 in the electrophotographic recording unit 41, and other elements of the multifunctional printer are the same as those of the first embodiment. Accordingly, in the single-sided reading operation, only the data on the reverse side (lower surface) of the read medium 3 is read. In the double-sided reading operation, the data on the reverse surface is first read and successively the data on the upper surface is read. It is possible to perform both single-sided reading and single-sided printing at the same time.

Figure 9:
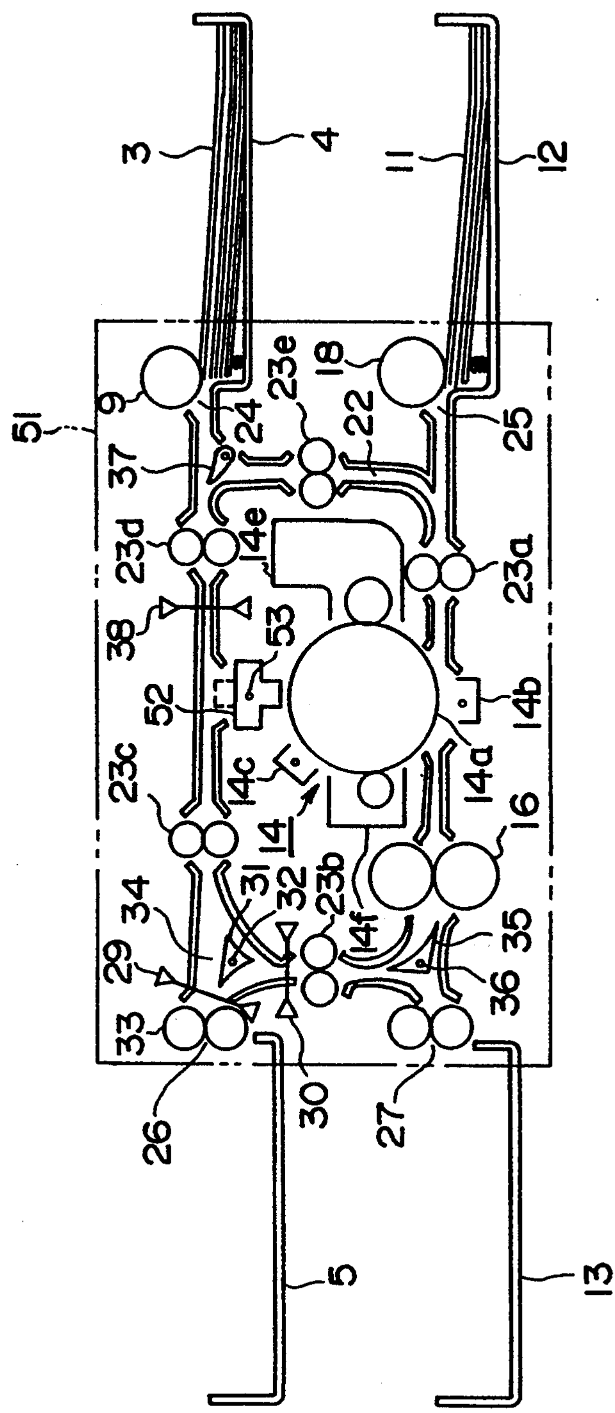
FIG. 9 is a view showing an arrangement of a multifunctional printer according to a third embodiment of the present invention.
Figure 10:
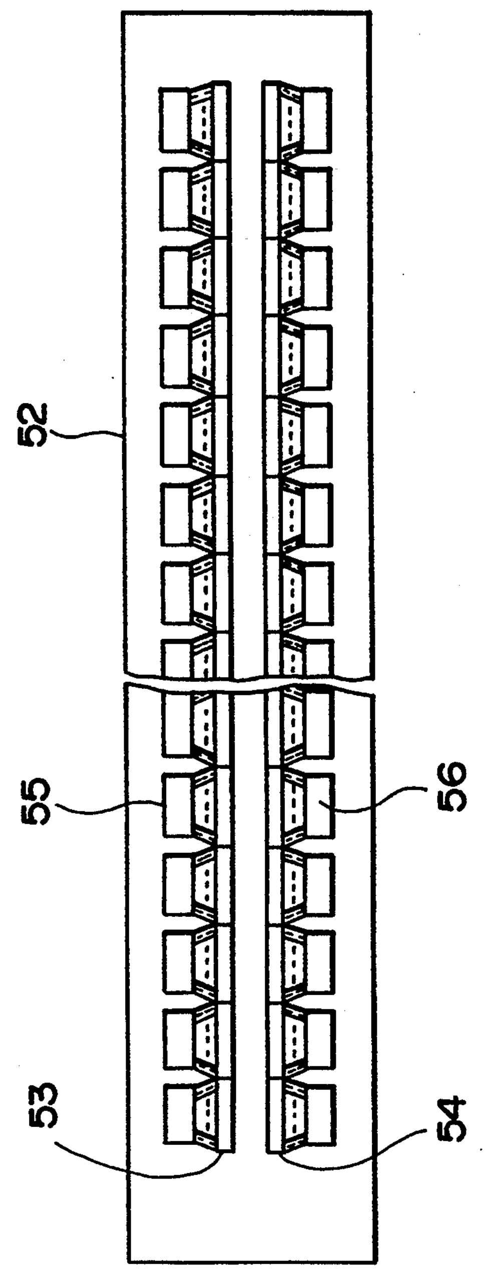
FIG. 10 is a plan view showing a light emitting and receiving head of FIG. 9.

Third Embodiment (FIGS. 9 and 10)

A multifunctional printer according to a third embodiment of the present invention will be described with reference to FIGS. 9 and 10. FIG. 9 is a view showing an arrangement of a multifunctional printer according to the third embodiment of the present invention. FIG. 10 is a plan view showing an arrangement of a light emitting and receiving head 52 in FIG. 9.

In FIG. 9, an electrophotographic recording unit 51 has a light emitting and receiving head 52 comprising a writing head for irradiating the photoconductor drum and a reading head, both heads being incorporated integrally so as to serve data reading and writing wherein the light emitting and receiving head 52 is turnable about a fulcrum 53 and is disposed between the photoconductor drum 14*a* and the enclosed medium carrying passage 22.

In FIG. 10, the light emitting and receiving head 52 comprises a light-emitting element array 53, a light-receiving element array 54, drivers 55 for driving a light-emitting element array 53 and read circuits 56 for amplifying the output of the light-receiving element array 54. As illustrated in FIG. 10, the light-emitting element array 53 comprises a plurality of light-emitting elements which form one line. The light-receiving array 54 comprises a plurality of light-receiving elements which form the other line. The other arrangements of the multifunctional printer of the third embodiment are the same as those of the first and second embodiments.

In a read mode, the light emitting and receiving head 52 is turned to the position as illustrated in broken lines in FIG. 9 to thereby read data on the read medium 3 which travels in the enclosed medium carrying passage 22. In a print mode, the light emitting and receiving head 52 faces the photoconductor drum 14*a*, as illustrated in solid lines, so as to irradiate the photoconductor drum 14*a*.

With the arrangement set forth above, the multifunctional printer according to the third embodiment can read the data and irradiate the photoconductor drum for printing the data so that the multifunctional printer can be smaller in size than those of the first and second embodiments.

Figure 11:
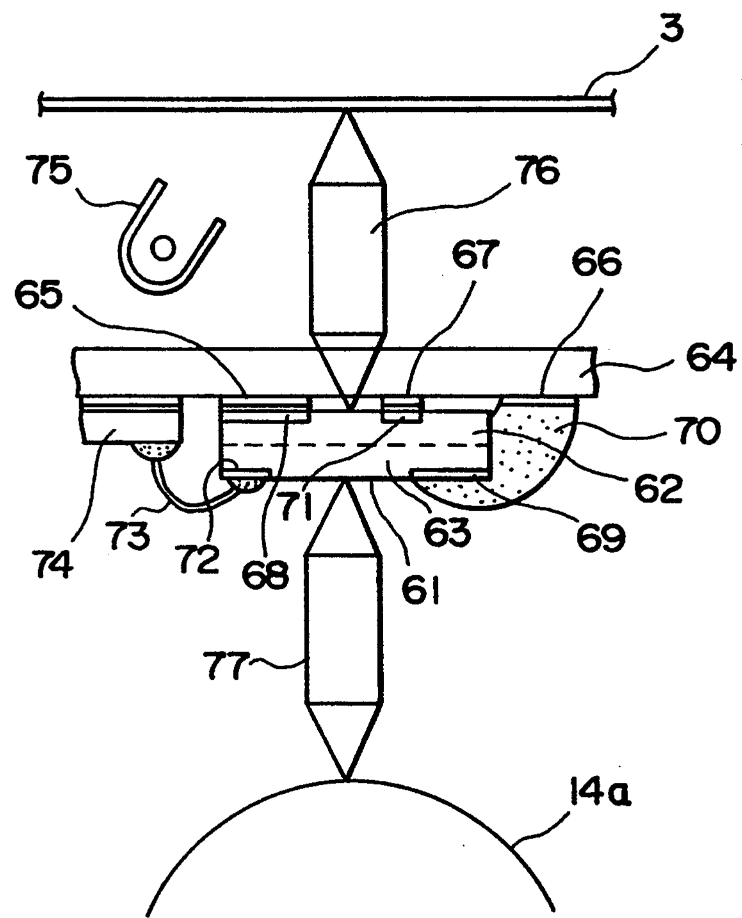
FIG. 11 is a view showing an arrangement of a multifunctional printer according to a fourth embodiment of the present invention.

Fourth Embodiment (FIG. 11)

A multifunctional printer according to a fourth embodiment of the present invention will be described with reference to FIG. 11 which shows an enlarged view of a light emitting and receiving head.

The multifunctional printer includes a light emitting and receiving head 61 which comprises light emitting elements and receiving elements incorporated integrally, in the same manner as the third embodiment. Other arrangements of the multifunctional printer of the fourth embodiment are the same as those of the first to third embodiments.

In FIG. 11, the light emitting and receiving head 61 comprises an arrayed light-receiving element layer 62 (such as a light receiving diode, a CCD, etc.) and an arrayed light emitting-element layer 63 (such as a light emitting diode) which are respectively incorporated into a semiconductor chip and mounted on a glass substrate 64. The glass substrate 64 has ground electrodes 65 and 66 and a signal electrode 67. The ground electrode 65 is connected to the ground electrode 68 of the light-receiving element layer 62 by means of a solder layer fused by heating a solder bump. The ground electrode 66 is connected to the ground electrode 69 of the light-emitting element layer 63 by means of a solder 70. The signal electrode 67 is connected to a light receiving signal input pad 71 by means of solder bump. A light-emitting signal output pad 72 of the light-emitting element layer 63 is connected to a light-emitting driver 74 byway of a wire 73.

The light-receiving element layer 62 receives light radiated from a light source 75 which is reflected from the read medium by way of a convergent lens 76 and the glass substrate 64. The light-emitting element layer 63 irradiates the photoconductor drum 14*a* by way of a convergent lens 77 so as to expose the surface of the photoconductor drum 14*a* to light based on the print data.

It is possible to miniaturize and easily manufacture the head with the provision of such a light emitting and receiving head 61. It is possible to perform both single-sided reading and single-sided printing at the same time.

According to the fourth embodiment having the arrangement set forth above, it is possible to make the multifunctional printer smaller in size and to eliminate a head rotating mechanism.

The present invention is not limited to the first to fourth embodiments set forth above but can be modified variously. For example, although the reading head 8 comprises only the light receiving element in the first and second embodiments, it may be replaced by the light-emitting and receiving head 52 of the third embodiment.

As mentioned above, since the medium carrying passage is commonly used for the read medium 3 and the print medium 11, it is possible to shorten the entire length of the medium carrying passage in the multifunctional printer.

Furthermore, the multifunctional printer can be miniaturized by using a light-emitting element array or light-receiving element array with a short optical system as the reading head or the exposing means.

What is claimed is:

1. A multifunctional device for reading and printing on a medium having opposite sides, comprising:

an enclosed medium carrying passage forming a closed path having opposite first and second directions;

transporting means for transporting the medium in said passage on said path, in the opposite first and second directions, said transporting means including means for transporting the medium along the entirety of said closed path without turning the medium upside down;

a printing portion on the path for printing data on the medium transported; and a reading portion on the path for reading data on the medium transported.

2. A multifunctional device according to claim 1, wherein the printing portion comprises an electrophotographic record portion.

3. A multifunctional device according to claim 1, wherein the reversing portion comprises rollers, switching blades and detecting sensors for detecting the presence of the medium.

4. A multifunctional device according to claim 1, wherein the printing portion comprises an electrophotographic record portion including a photoconductor body.

5. A multifunctional device according to claim 4, wherein the reading portion includes a light-emitting portion, and wherein an exposing portion of the electrophotographic record portion is turnably attached to the enclosed medium carrying passage and serves also as the light-emitting portion.

6. A multifunctional device according to claim 5, wherein the electrophotographic record portion has a structure that light-emitting elements and light-receiving elements, are integrally formed in an array form.

7. A multifunctional device according to claim 1, wherein said transporting means includes means for transporting the medium along the entirety of said closed path while maintaining the medium continuously on said path.

8. A multifunctional device according to claim 1, wherein said transporting means includes a reversing portion in said passage for turning the medium transported upside down.

9. A multifunctional device according to claim 8, wherein said reversing portion is positioned in said passage so as to receive the medium transported in said passage from either of the opposite first and second directions, said transporting means comprising means for transporting the medium to said reversing portion from either of the opposite first and second directions, said reversing portion including means for turning upside down the medium transported in the first direction and the medium transported in the second direction.

10. A multifunctional device according to claim 9, further comprising a control unit, said transporting means being controlled by said control unit alternatively to turn upside down with said reversing portion the medium transported in the first direction, and then transport the upside down medium in the second direction, turn upside down with said reversing portion the medium transported in the second direction, and then transport the upside down medium in the second direction, and transport the medium in the second direction to and past said reversing portion without turning the medium upside down.

11. A multifunctional device according to claim 1, further comprising:

medium insertion port means for inserting the medium from an exterior of the device into said passage; and medium discharge port means, opposite said medium insertion port means with respect to said passage, for discharging the medium from said passage to the exterior of the device.

12. A multifunctional device according to claim 11, wherein said medium insertion port means comprises first and second insertion ports and said medium discharge port means includes first and second discharge ports, said closed path including a first segment extending between said first insertion port and said first discharge port and a second segment extending between said second insertion port and said second discharge port, said printing portion on said first segment, said reading portion on said second segment.

13. A multifunctional device according to claim 12, wherein said transporting means includes a reversing portion in said passage for turning the medium transported upside down.

14. A multifunctional device according to claim 13, further comprising means for controlling said transporting means, said printing portion and said reading portion, for performing double-sided reading and double-sided printing, such that for double-sided reading, said transporting means transports the medium from said first insertion port toward said first discharge port along said first segment past said reading portion, and thereafter turns the medium transported upside down and transports the medium toward said first insertion port along said first segment past said reading portion.

15. A multifunctional device according to claim 14, wherein said first segment extends from said first insertion port to said first discharge port in the first direction, and wherein said transporting means transports the medium from said first insertion port in the first direction along said first segment past said reading portion, and thereafter turns the transported medium upside down, and then, while maintaining the upside down medium continuously on said path, successively transports the upside down medium twice past said reading portion along said first segment, once in the second direction and then again in the first direction.

16. A multifunctional device according to claim 15, wherein for double-sided printing by said printing portion, said controlling means controls said transporting means to transport the medium in a predetermined direction from said second insertion port toward said second discharge port along said second segment past said printing portion, and thereafter turns the medium upside down and transports the medium in said predetermined direction along a remainder of said closed path, terminating at said second discharge port.

17. A multifunctional device according to claim 13, wherein said first segment extends from said first insertion port to said first discharge port in the first direction, said second segment extending from said second insertion port to said second discharge port in the second direction, said closed path including a third segment connecting said second discharge port to said first discharge port, said reversing portion positioned in said passage at said first discharge port, so as to receive the medium transported in the first direction by way of said first segment and to receive the medium transported in the second direction by way of said second and third segments, said reversing portion including means for turning upside down the medium transported in the first direction and the medium transported in the second direction, said transporting means comprising means for transporting the medium to said reversing portion from said first insertion port in the first direction and for transporting the medium to said reversing portion from said second insertion port in the second direction.

18. A multifunctional device according to claim 12, wherein said first and second segments are straight and parallel to each other.

19. A multifunctional device according to claim 11, further comprising means for controlling said transporting means to repeatedly transport the same medium on said path past said printing portion without turning the medium upside down and without diverting the medium from said path, and controlling said printing portion so as to repeatedly print on the same side of the medium.

20. A multifunctional device according to claim 11, wherein said printing portion is surrounded by said closed path, said reading portion outside of said closed path, further comprising means for controlling said transporting means and the reading and printing portions, to continuously transport the same medium along said closed path past said reading portion and said printing portion and to consecutively read from one side of the medium transported and then print on the opposite side of the medium transported.

21. A multifunctional device according to claim 11, wherein said printing portion and said reading portion are surrounded by said closed path, said transporting means including a reversing portion in said passage for turning the medium upside down, further comprising means for controlling said transporting means, said reading portion and said printing portion, to continuously transport the same medium in said passage past said reading portion and said printing portion without turning the medium upside down, while consecutively performing single-sided reading and single-sided printing on the same side of the same medium.

22. A multifunctional device for reading and printing on a medium, comprising:

an enclosed medium carrying passage, said passage forming a closed path, said path including horizontal first and second segments, a vertical third segment connecting respective first ends of said first and second segments, and a vertical fourth segment connecting respective second ends of said first and second segments;

four ports, positioned at respective intersections of said first and second segments with said third and fourth segments, for inserting the medium from an exterior of the device into said passage and discharging the medium from said passage to the exterior of the device;

means for transporting the medium in said passage in opposite first and second directions, including a reversing portion in said passage for turning the medium upside down, said transporting means including three switching blades in said passage respectively adjacent three of said four ports, at least one respective reversible driven roller in each of said segments and in at least one of said ports;

said reversing portion including one of said switching blades, a plurality of the rollers, and a plurality of sensors for detecting the medium; and first and second data transfer means, respectively positioned on said first segment and said second segment, for transferring data between the device and the medium transported, one of said first and second data transfer means including a printing portion operative for printing data onto the medium transported, the other of said first and second transfer means including a reading portion operative for reading data from the medium transported.

23. A multifunctional device according to claim 22, wherein said transporting means comprises:

means for transporting the medium to said reversing portion in either of the first and second directions, and means for transporting the medium along the entirety of said path, including past said reversing portion, without turning the medium upside down, said reversing portion including means for turning upside down both the medium transported in the first direction and the medium transported in the second direction.

* * * * *